(12) United States Patent
Yu

(10) Patent No.: US 6,469,758 B2
(45) Date of Patent: Oct. 22, 2002

(54) COLOR FILTER

(75) Inventor: Jun Young Yu, Kumi-shi (KR)

(73) Assignee: L.G. Philips LCD Co., Ltd., Seoul (KR)

(*) Notice: Subject to any disclaimer, the term of this patent is extended or adjusted under 35 U.S.C. 154(b) by 36 days.

(21) Appl. No.: 09/735,512

(22) Filed: Dec. 14, 2000

(65) Prior Publication Data

US 2001/0053035 A1 Dec. 20, 2001

(30) Foreign Application Priority Data

Dec. 14, 1999 (KR) .......................................... 99-57571

(51) Int. Cl.$^7$ ............................................. G02F 1/1325
(52) U.S. Cl. ........................ 349/106; 349/140; 349/111
(58) Field of Search ................................. 349/110, 111, 349/106; 359/891; 430/7

(56) References Cited

U.S. PATENT DOCUMENTS 4,793,691 A * 12/1988 Enomoto et al. ........... 349/106
5,568,292 A * 10/1996 Kim ............................ 349/106

FOREIGN PATENT DOCUMENTS

JP          5-72559      * 3/1993 .................. 349/110

\* cited by examiner

Primary Examiner—James Dudek
(74) Attorney, Agent, or Firm—Birch, Stewart, Kolasch & Birch, LLP

(57) ABSTRACT

A color filter that is adapted to be changeably used for a twisted nematic (TN) mode LCD and an in-plane switching mode (IPS) mode LCD by forming a light-shielding layer at the rear side of a transparent substrate to improve surface morphology. In the color filter, a light-shielding layer is formed from a metal material on a second surface of a transparent substrate having first and second surfaces to have a lattice shape. First, second and third filters are formed at a portion which does not correspond to the light-shielding layer on the first surface of the transparent substrate in manner such that a desired portion is overlapped with the light-shielding layer, thereby transmitting red, green and blue color lights, respectively. Accordingly, the light-shielding layer is formed on the second surface of the transparent substrate to prevent deterioration in surface morphology. Even though the first and second light-shielding layers are removed by stripped particles generated during the continuous deposition process to provide pinholes, light leakage can be prevented by virtue of the third light-shielding layer. Also, the first to third light-shielding layers are made from a metal or a metal oxide, so that it becomes possible to prevent stain formation caused by adhesion weakness between the light-shielding layer and the transparent substrate.

10 Claims, 4 Drawing Sheets

COLOR FILTER

BACKGROUND OF THE INVENTION

1. Field of the Invention

The present invention relates to a color filter for a liquid crystal display (LCD), and more particularly to a color filter that is adapted to be changeably used for a twisted nematic (TN) mode LCD and in a plane switching (IPS) mode LCD by forming a light-shielding layer at the rear side of a transparent substrate to improve surface morphology.

2. Description of the Related Art

Generally, a liquid crystal display (LCD) includes switching devices constituted by thin film transistors, each of which consists of a gate electrode, a gate insulating film, an active layer, an ohmic contact layer, source and drain electrodes, and a liquid crystal injected between a lower plate provided with pixel electrodes and an upper plate provided with color filters. The color filter includes red(R), green(G) and blue(B) unit filters on a transparent substrate, and a light-shielding layer for preventing deterioration of brightness and color purity among these unit filters. The color filter has a different configuration depending on the mode of the LCD. In the color filter used for the TN mode, a common electrode is formed on the unit filters. On the other hand, in the color filter used for the IPS mode, a protective film, instead of the common electrode, is formed on the unit filters and the light-shielding layer is made from only a resin so as to prevent an undesired affect to a horizontal electric field of the lower plate. Also, in the color filter used for the IPS mode, a transparent ground electrode for eliminating static electricity at the screen is formed at the rear surface of the transparent substrate, that is, at the surface in which the unit filters are not formed.

FIG. 1 is a sectional view showing a structural example of a conventional color filter for a TN mode LCD. Referring to FIG. 1, in the conventional color filter, a first light-shielding layer 13 formed of a metal oxide film and a second light-shielding layer 15 formed of a metal film are disposed in a lattice shape on a transparent substrate 11. The first light-shielding layer 13 may be formed of a twofold film consisting of a metal oxide film and a metal nitride film. First, second and third filters 17a, 17b and 17c for transmitting R, G and B color lights, respectively are formed at a portion in which the first and second light-shielding layers 13 and 15 on the transparent substrate 11 are not formed. The first, second and third filters 17a, 17b and 17c are made from an acrylic resin or polyimide group resin dispersed with pigments, and is separately formed on the first and second light-shielding layers 13 and 15 to prevent color mixture.

A common electrode 19 made from a transparent conductive material such as an indium tin oxide (ITO), a tin oxide (TO) or an indium zinc oxide (IZO), etc. is formed on the first to third filters 17a, 17b and 17c. The common electrode 19 allows the first to third filters 17a, 17b and 17c to not contact a liquid crystal so as to prevent its damage.

FIG. 2 is a sectional view showing a structural example of a conventional color filter for an IPS mode LCD. Referring to FIG. 2, in the conventional color filter, a light-shielding layer 23 in which a resin dispersed with an electrically insulated black pigment has a lattice shape is formed on transparent substrate 21. First, second and third filters 27a, 27b and 27c for transmitting R, G and B color lights, respectively are formed at a portion in which the light-shielding layer 23 are not formed. The first, second and third filters 27a, 27b and 27c are made from an acrylic resin or polyimide group resin dispersed with pigments, and is separately formed on the light-shielding layer 23 so as to prevent color mixture. In the case of forming the light-shielding layer 23 from a conductive material, a horizontal electric field generated from the lower plate causes drive problems due to noise generated upon drive control due to a derivative electric field generated by the conductive material.

A protective layer 25 is formed on the first to third filters 27a, 27b and 27c. The protective layer 25 plays a role isolating the first to third filters 27a, 27b and 27c from contact with a liquid crystal (to cause damage thereto), and is made from a transparent material having an insulating characteristic, such as polyimide. A ground electrode 29 is formed on the rear surface of the transparent substrate 21, that is, on the surface in which the first to third filters 27a, 27b and 27c are formed. The ground electrode 29 eliminates static electricity on a screen to prevent generation of domain stains, and is made from a transparent conductive material such as ITO, TO or IZO, etc.

However, the conventional color filter has a problem in that a step difference is generated at a portion where each of the filters overlaps by a thickness of the light-shielding layer, to cause deterioration in surface morphology. The TN mode color filter has a problem in that, when a stacked structure of a metal oxide film and a metal film is formed, pinholes are generated during the cleaning after generation of stripped particles in a continuous film formation process to thereby cause a light leakage phenomenon. The IPS mode color filter has a problem in that, since the light-shielding layer is made from only a resin and formed after formation of the ground electrode, a stain is generated due to its contact with a conveyer machine (e.g., a roller and a robot hand, etc.) upon formation of the ground electrode at the rear side of the transparent substrate, or an adhesion between the light-shielding layer and the transparent substrate is weakened to cause stain formation.

SUMMARY OF THE INVENTION

Accordingly, it is an object of the present invention to provide a color filter wherein a light-shielding layer is formed at the rear side of a transparent substrate to prevent deterioration of surface morphology.

A further object of the present invention is to provide a color filter that is capable of preventing light leakage caused by pinholes generated at a light-shielding layer.

A yet further object of the present invention is to provide a color filter that is capable of preventing stain formation caused by adhesion weakness between a light-shielding layer and a transparent substrate.

In order to achieve these and other objects of the invention, a color filter according to an embodiment of the present invention includes a light-shielding layer having a lattice shape formed from a metal material on a second surface of a transparent substrate having first and second surfaces; and first, second and third filters, being formed at a portion which does not correspond to the light-shielding layer on the first surface of the transparent substrate in such a manner so as to have a desired portion overlapped with the light-shielding layer, to transmit red, green and blue color lights, respectively.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
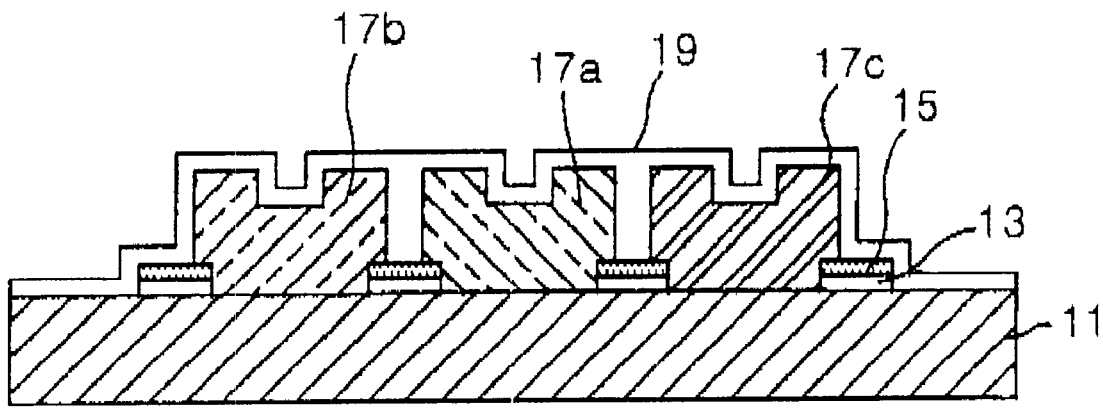
FIG. 1 is a sectional view showing a structural example of a conventional color filter for a TN mode LCD.
Figure 2:
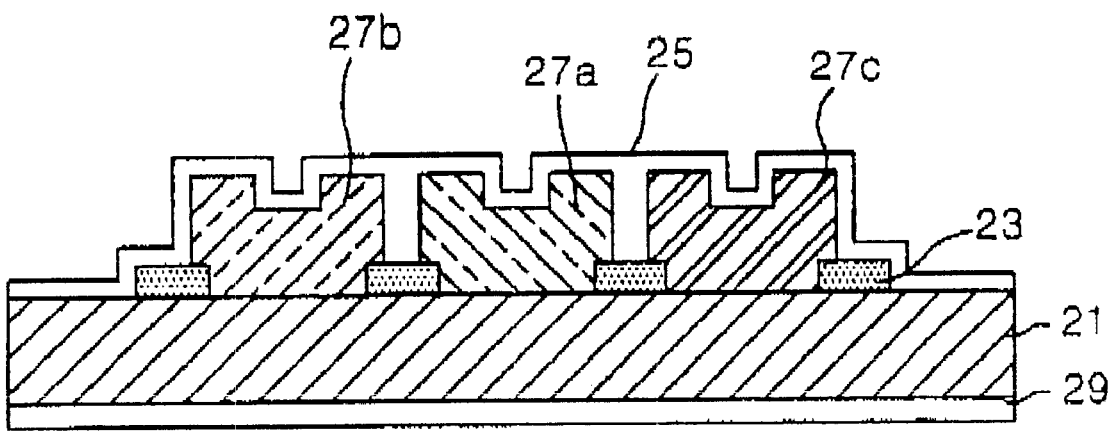
FIG. 2 is a section view showing a structural example of a conventional color filter for an IPS mode LCD.
Figure 3:
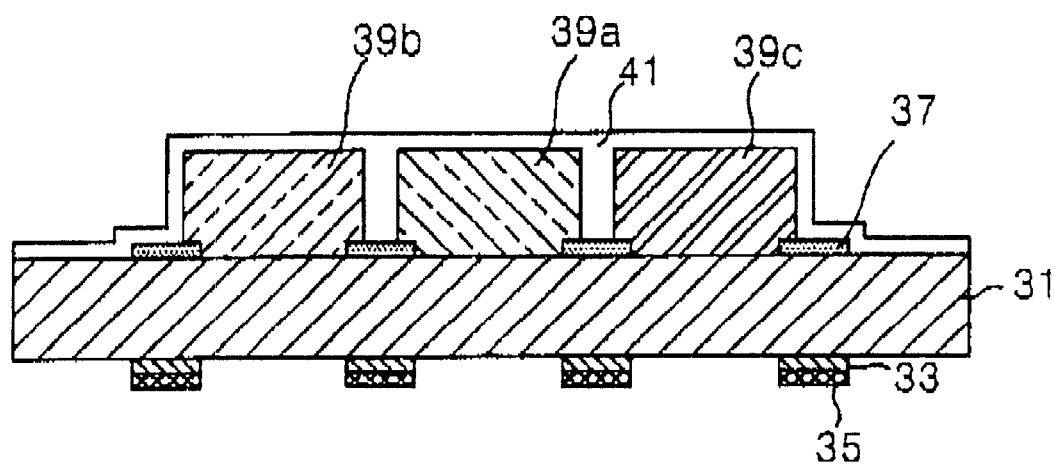
FIG. 3 is a section view showing a structure of a color filter for a TN mode LCD according to an embodiment of the present invention.

Referring to FIG. 3, there is shown a color filter for a TN mode LCD according to an embodiment of the present invention. In the color filter, first and second light-shielding layers 33 and 35 are disposed in a lattice shape on a second surface of a transparent substrate 31 having first and second surfaces. The first light-shielding layer 33 is made from a metal such as chromium (Cr) having a thickness of more than 800 Å while the second light-shielding layer 35 is made from a metal oxide such as chromium oxide ($Cr_2O_3$) having a thickness of 300 to 1000 Å. Alternatively, the first and second light-shielding layers 33 and 35 may be formed of a twofold film consisting of a metal oxide film and a metal nitride film. Incident light is reflected from each surface of the first and second light-shielding layers 33 and 35. Light reflected from each of the surfaces of the first and second light-shielding layers 33 and 35 undergoes extinction interference to prevent progress of the light.

A third light-shielding layer 37 is formed in a lattice shape on the first surface of the substrate, being opposed to the second surface having the first and second light-shielding layers 33 and 35. The third light-shielding layer 37 is formed from a metal oxide film such as chromium oxide ($Cr_2O_3$) having a thickness of 300 to 700 Å at a portion opposite to the first and second light-shielding layers 33 and 35. Thus, the third light-shielding layer 37 can prevent generation of light leakage even though the first and second light-shielding layers 33 and 35 are removed by stripped particles to provide pinholes.

The first to third filters 39a, 39b and 39c for transmitting R, G and B color light, respectively are formed at a portion where the third light-shielding layer 37 on the first surface of the transparent substrate 31 is not formed. The first to third filters 39a, 39b and 39c are made from an acrylic or polyimide group resin dispersed with R, G and B pigments and are separately formed on the third light-shielding layer 37 so as to prevent color mixture. Since the third light-shielding layer 37 is formed having a small thickness, the first to third filters 39a, 39b and 39c have a reduced step difference at a portion overlapping with the third light-shielding layer 37 to improve surface morphology.

A common electrode 41 made from a transparent conductive material such as ITO, TO or IZO is formed on the first to third filters 39a, 39b and 39c. The common electrode 41 drives a liquid crystal with a voltage difference from a pixel electrode at a lower plate (not shown). Also, the common electrode 41 prevents the first to third filters 39a, 39b and 39c from contacting the liquid crystal to thereby cause their damage.

Figure 4:
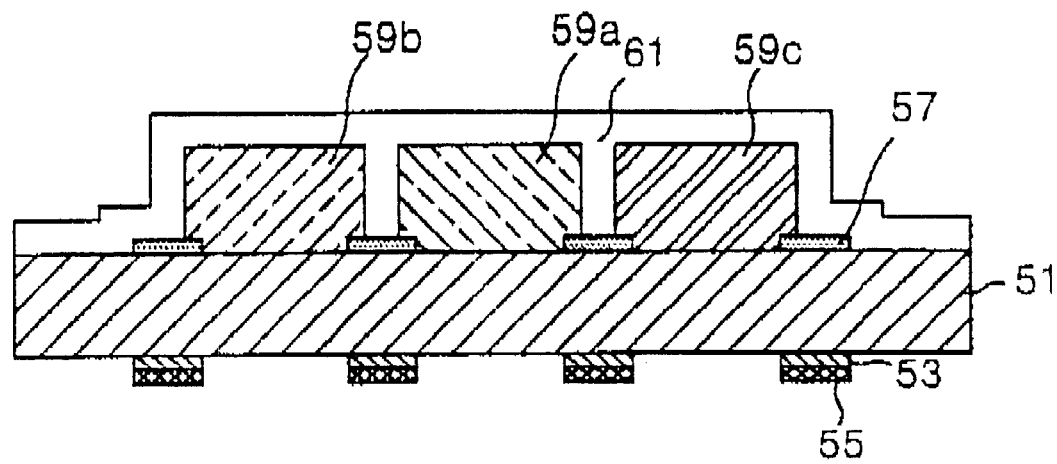
FIG. 4 is a section view showing a structure of a color filter for a IPS mode LCD according to another embodiment of the present invention; and FIG. 5A to FIG. 5D represents a process of fabricating a color filter as shown in FIG. 3.

Referring to FIG. 4, there is shown a color filter for an IPS mode LCD according to another embodiment of the present invention. The color filter for the IPS mode LCD has a structure similar to the color filter for the TN mode LCD shown in FIG. 3 except that a protective layer 61 instead of the common electrode 41 is formed on the first to third filters 39a, 39b and 39c. More specifically, first and second light-shielding layers 53 and 55 are disposed in a lattice shape on a second surface of a transparent substrate 51. A third light-shielding layer 57 is formed on the first surface opposed to the second surface at a portion corresponding to the first and second light-shielding layers 53 and 55. The first to third filters 59a, 59b and 59c for transmitting R, G and B color lights, respectively are formed at a portion where the third light-shielding layer 57 on the second surface are not provided.

Protective layer 61 made from a transparent insulation material such as an epoxy resin or an acrylic resin, etc. is formed on the first to third filters 59a, 59b and 59c. The protective layer 61 prevents the first to third filters 59a, 59b and 59c from contact with a liquid crystal, and thus prevents damage thereto.

In the above-mentioned structure, a conductive material layer does not exist on the first surface of the transparent substrate 51, so that an undesired affect to a horizontal electric field of a lower plate (not shown) is prevented. The first light-shielding layer 53 formed from a metal such as a chromium (Cr) on the second surface of the transparent substrate 51 may be used as a ground electrode for eliminating static electricity on a screen. Also, the first light-shielding layer 53 is made from a metal while the second and third light-shielding layers 55 and 57 are made from a metal oxide. Stain formation problems are prevented and adhesive force to the transparent substrate 51 is improved.

Figure 5A:
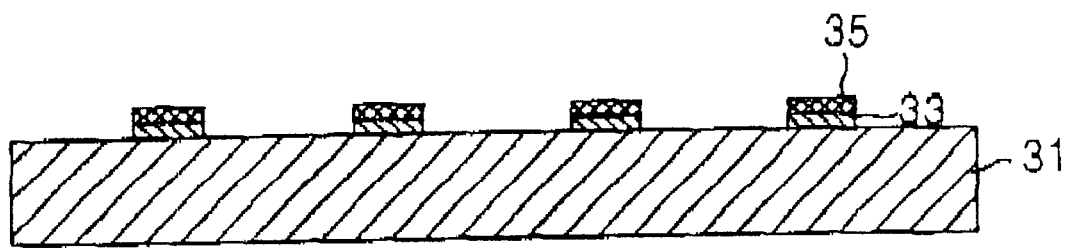
Figure 5B:
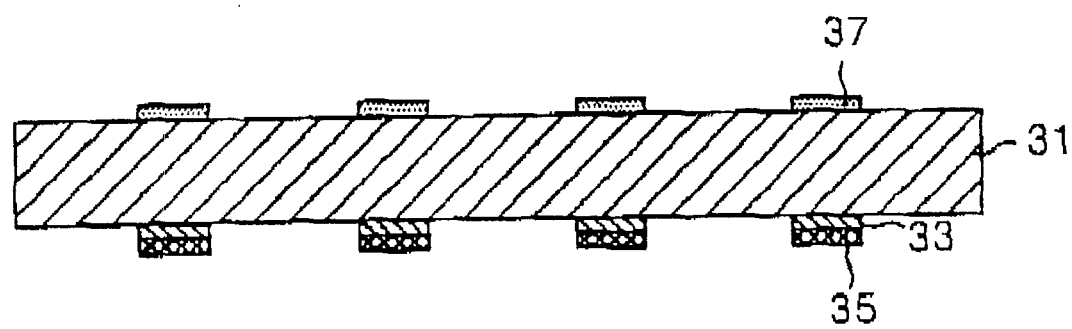

FIG. 5A to FIG. 5B represent a process of fabricating the color filter shown in FIG. 3. Referring to FIG. 5A, the first and second light-shielding layers 33 and 35 having a lattice shape are formed on the second surface of the transparent substrate 31 having the first and second surfaces. The first and second light-shielding layers 33 and 35 is formed by continuously depositing a metal oxide film such as a twofold film of a metal and a chromium oxide ($Cr_2O_3$) or a metal nitride film such as a twofold film of a chromium oxide ($Cr_2O_3$) and a chromium nitride ($CrN_yO_x$) on the second surface of the transparent substrate 31 to a thickness of about 1000 to 2000 Å, and a thickness of about 300 to 700 Å respectively, using the sputtering technique and then patterning the same using photolithography.

Referring to FIG. 5B, the third light-shielding layer 37 corresponding to the first and second light-shielding layers 33 and 35 is formed on the first surface of the transparent substrate 31. The third light-shielding layer 37 is formed by depositing a metal oxide film such as chromium oxide ($Cr_2O_3$) on the first surface of the transparent substrate 31 to a thickness of about 300 to 700 Å using a sputtering technique and then patterning the same using photolithography. At this time, the third light-shielding layer 37 is patterned to correspond to the first and second light-shielding layers 33 and 35. The third light-shielding layer 37 prevents generation of light leakage even though the first and second light-shielding layers 33 and 35 formed on the second surface of the substrate 31 are removed by stripped particles to provide pinholes.

Figure 5C:
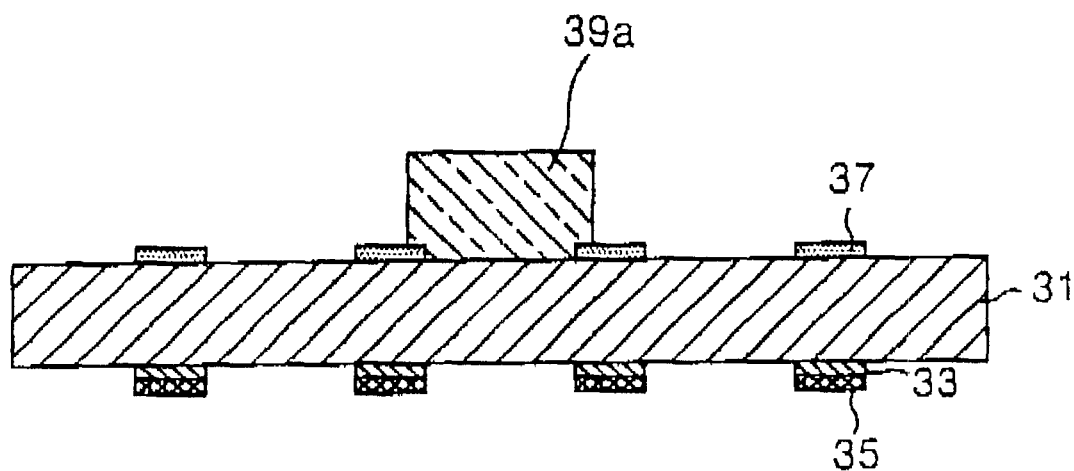

Referring to FIG. 5C, the first filter 39A for transmitting only any one of R, G and B color light, for example, only the R color light is provided at a desired portion on the first surface of the transparent substrate 31. The first filter 39a is formed by coating an acrylic or polyimide group resin dispersed with a R color pigment on the first surface of the transparent substrate 31 and then exposing and developing the same and thereafter patterning the same in such a manner so as to be left only at a desired portion thereof. At this time, the first filter 39a overlaps with the desired portion of the third light-shielding layer 37. Since the third light-shielding layer 37 has a small thickness, the first filter 39a has a reduced step difference at a portion overlapping with the third light-shielding layer 37 to thereby improve surface morphology in comparison to the case of forming the existent black matrix film of a metal or a resin.

Figure 5D:
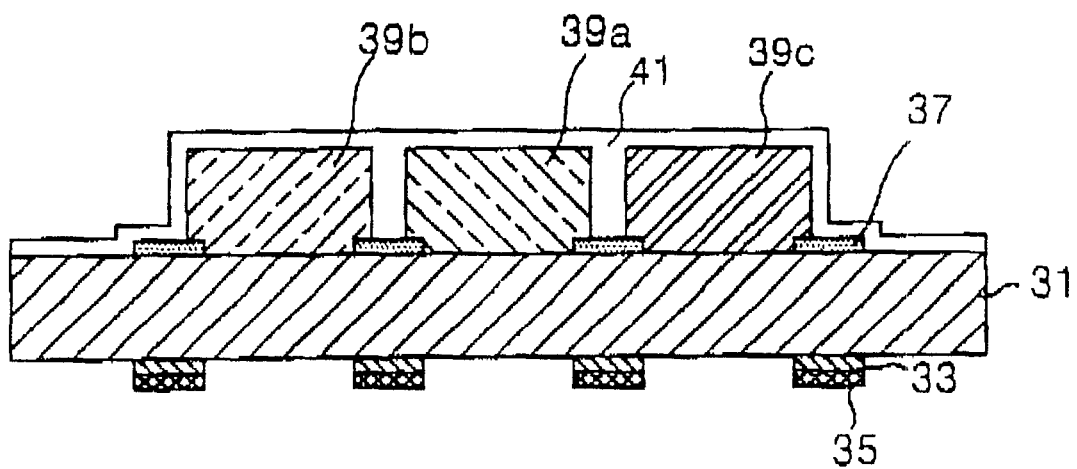

Referring to FIG. 5D, the second and third filters 39b and 39c are continuously formed at a desired portion on the first surface of the transparent substrate 31 in the same manner as the first filter 39a. The second and third filters 39b and 39c transmit only G and B color lights except for an R color light in the R, G and B color lights. At this time, since the third light-shielding layer 37 has a small thickness, the second and third filters 39b and 39c also have a reduced step difference at a portion overlapping with the third light-shielding layer 37 to improve surface morphology.

The transparent common electrode 41 is formed on the first to third filters 39a, 39b and 39c. The common electrode 41 is formed by depositing a transparent conductive material such as ITO, TO or IZO, etc. on the first to third filters 39a, 39b and 39c using a sputtering technique.

The method of forming the first and second light-shielding layers 53 and 55 having a lattice shape on the second surface of the transparent substrate 51, and then the third light-shielding layer 57 on the first surface and thereafter form the first to third filters 59a, 59b and 59c on the first surface of the transparent substrate 51 in a method of fabricating the color filter shown in FIG. 4 is similar to the method of fabricating the color filter shown in FIG. 3.

In the method of fabricating the color filter shown in FIG. 4, however, the protective layer 61 is formed from a transparent insulation material such as an epoxy resin or an acryl, etc. on the first to third filters 59a, 59b and 59c, unlike the method of fabricating the color filter shown in FIG. 3. According to the method of fabricating the color filter shown in FIG. 4, the first light-shielding layer 53 is made from a metal while the second and third light-shielding layers 55 and 57 are made from a metal oxide, so that an adhesive force to the transparent substrate 51 can be improved to thereby prevent stain formation.

As described above, according to the present invention, the light-shielding layer is formed on the second surface of the transparent substrate to prevent a deterioration of surface morphology. Also, even though the first and second light-shielding layers are removed by stripped particles generated during the continuous deposition process to provide the pinholes, light leakage can be prevented by virtue of the third light-shielding layer. In addition, the first to third light-shielding layers are made from a metal or a metal oxide, so that it becomes possible to prevent stain formation caused by adhesion weakness between the light-shielding layer and the transparent substrate.

Although the present invention has been explained by the embodiments shown in the drawings described above, it should be understood to the ordinary skilled person in the art that the invention is not limited to the embodiments shown but, rather, that various changes or modifications thereof are possible without departing from the spirit and scope of the invention.

What is claimed is:

1. A color filter comprising:
a light-shielding layer on a second surface of a transparent substrate, said transparent substrate having first and second surfaces to have a lattice shape; and
first, second and third filters, on and at a portion of the same transparent substrate on which said light shielding layer is formed, said portion being a portion which does not correspond to the light-shielding layer on the first surface of said transparent substrate, said filters being formed in a manner such that a desired portion of said filters is overlapped with the light-shielding layer, to transmit red, green and blue color lights, respectively.

2. A color filter comprising:
a light-shielding layer on a second surface of a transparent substrate, having first and second surfaces to have a lattice shape, wherein the light-shielding layer formed on the second surface is a stacked structure of a first light shielding layer formed from a metal film and a second light-shielding layer formed from a metal oxide film or a metal nitride film; and
first, second and third filters, being formed at portion which does not correspond to the light-shielding layer on the first surface of the transparent substrate in a manner such that a desired portion is overlapped with the light-shielding layer, to transmit red, green and blue color lights, respectively.

3. The color filter according to claim 2, wherein the first light-shielding layer is made from chromium (Cr), and having a thickness of more than 800 Å.

4. The color filter according to claim 2, wherein the second light-shielding layer is formed of a twofold film of a chromium oxide ($Cr_2O_3$) and a chromium nitride ($CrN_yO_x$), having a thickness of 300 to 1000 Å.

5. The color filter according to claim 2 wherein the light-shielding layer formed on the first surface is made of a metal material having a lattice construction.

6. The color filter according to claim 5, wherein the third light-shielding layer is made from a chromium oxide ($Cr_2O_3$) to have a thickness of 300 to 1000 Å.

7. The color filter according to claim 2 wherein the first, second and third filters are separately formed from an acrylic or polyimide group resin dispersed with pigments.

8. The color filter according to claim 2, further comprising:
a transparent common electrode formed from an indium tin oxide (ITO), a tin oxide (TO) or an indium zinc oxide (IZO) on the first, second and third filters.

9. The color filter according to claim 2, further comprising:
a protective layer formed from a transparent insulation material of an epoxy resin or an acrylic resin, formed on the first, second and third filters.

10. A color filter comprising:
a light-shielding layer on a second surface of a transparent substrate said transparent substrate having first and second surfaces to have a lattice shape; and
first, second and third filters, being formed at portion which does not correspond to the light-shielding layer on the first surface of the transparent substrate in a manner such that a desired portion is overlapped with the light-shielding layer, to transmit red, green and blue color lights, respectively; and
a transparent common electrode formed from an indium thin oxide (ITO), a tin oxide (TO) or an indium zinc oxide (IZO) on the first, second and third filters.

* * * * *